April 15, 1969   E. R. WHITE   3,438,814
FUEL CELL UNIT EQUIPPED TO CONSUME EXCESS GASEOUS REACTANT
Filed April 27, 1966
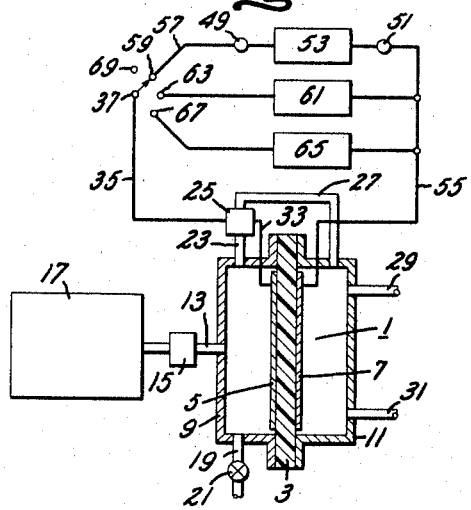
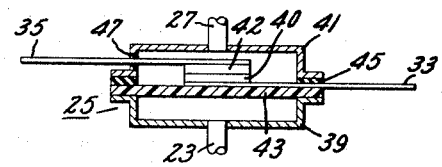
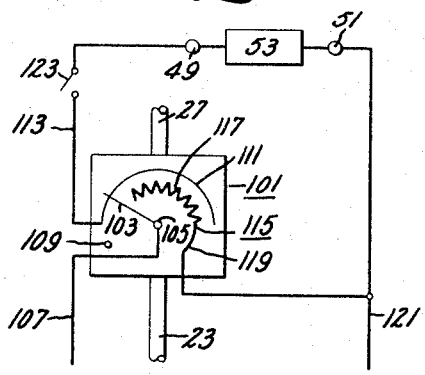
Inventor:
Eugene R. White,
by Carl O. Thomas
His Attorney.

United States Patent Office 3,438,814
Patented Apr. 15, 1969

3,438,814
FUEL CELL UNIT EQUIPPED TO CONSUME EXCESS GASEOUS REACTANT
Eugene Robert White, Topsfield, Mass., assignor to General Electric Company, a corporation of New York
Filed Apr. 27, 1966, Ser. No. 545,606
Int. Cl. H01m 27/12
U.S. Cl. 136—86
10 Claims My invention relates to an electrical energy generating unit of improved safety and convenience.

Over the last decade considerable attention has focused upon developing the fuel cell into a low cost, widely used device for the generation of electrical energy. In the most commonly used types of conventional fuel cells an electrochemically oxidizable gaseous fuel, such as hydrogen, methane, carbon monoxide, etc., is supplied to an anode while an electrochemically reducible gaseous oxidant, such as air, oxygen, halogen, hydrogen peroxide, etc., is supplied to a cathode. The anode and cathode are separated by an electrolyte. In order to reduce the internal resistance of the fuel cell the separation between the electrodes is held to the smallest readily practical spacing, frequently in the order of a few mils.

It was early considered that the juxtaposition of substantial quantities of fuel and oxidant in fuel cells would render these devices potentially hazardous in the event of malfunction. It is well known, for example, that platinum metals, widely employed in fuel cell electrodes as electrocatalysts, are capable of readily exothermally combining hydrogen and oxygen. It was accordingly theorized that any direct mixing of reactants, as by diffusion through a small communication between the electrodes, could lead to catastrophic failures with risk of explosion and/or fire resulting. Further, it was noted that in minimizing the electrode spacing the strength of each cell was curtailed, thereby increasing the danger of an inadvertent pressure differential of relatively modest proportion rupturing the electrolyte barrier between the reactants (followed by direct mixing, fire, and/or explosion).

Without commenting on the validity of these earlier theoretical predictions of safety hazards, it is considered here sufficient to note that in the testing and use of fuel cells to date, including the most experimental designs, injury to personnel has been conspicuously absent. In fuel cells employing ion exchange membranes as an electrolyte barrier, for example, development of pinholes in the membrane after extended life testing is not uncommon. This failure mode, however, has not presented either an explosion or fire hazard to personnel.

In fact, fuel cells have proven themselves sufficiently from a safety standpoint that the early hazard predictions are now largely discounted by the present class of users. It should be pointed out, however, that these users are not representative of the general public. The overwhelming majority of fuel cell users to date have either received college-level training in the related physical sciences and/or have been carefully indoctrinated in the theory and use of fuel cells.

In considering the transition of fuel cell use from the present select class of users to use by the general public, including those from the underdeveloped regions, there is a need to provide a fuel cell unit for the generation of electrical energy which—to the extent possible—is not only safe and efficient when properly handled, but also safe in the hands of the uneducated, the uninstructed, the careless, or the willfully abusive user.

It is an object of my invention to provide an electrical energy generating unit that is simple and convenient to use.

It is another object to provide a generating unit which minimizes the potential hazards of fire and/or explosion.

It is a further object to provide a generating unit in which creation of excessive pressure differentials is obviated.

These and other objects of my invention are accomplished by providing a fuel cell electrode-electrolyte assembly formed of first and second electrodes separated by electrolyte means. Housing means cooperate with the electrode-electrolyte assembly to confine a gaseous reactant adjacent the first electrode and to permit a second reactant to contact the second electrode. Means are provided to form an electrical circuit extending between the electrodes. This means is comprised of first and second terminal means for permitting an electrical load to be connected thereto. A means is provided for selectively shunting the electrical load, and a means is provided for selectively opening the electrical circuit between the electrodes in response to a predetermined negative pressure adjacent the first electrode as compared to the pressure adjacent the second electrode.

My invention may be better understood by reference to the following detailed description considered in conjunction with the drawings, in which FIGURE 1 is a schematic view, partly in section, of a device constructed according to my invention;

FIGURE 2 is a vertical section of a pressure differential responsive switch; and FIGURE 3 is a schematic view of a modified control for my device.

FIGURE 1 schematically illustrates a device constructed according to my invention. An electrode-electrolyte assembly 1 is provided formed of an ion exchange membrane 3 serving as an electrolyte means spacing first and second electrodes 5 and 7.

The electrode-electrolyte assembly cooperates with a housing means formed of a first housing portion 9 and a second housing portion 11. The first housing portion is provided with a first conduit means 13 attached to a flow control device 15. The flow control device may be a valve, check valve, and/or pressure regulator. A conventional source of gaseous electrochemically oxidizable fuel 17 is attached to the flow control device. The first housing portion is also provided with a second conduit means 19 controlled by flow control device 21. A third conduit means 23 extends from the first housing portion to a pressure differential responsive switch 25, hereinafter more fully described.

A conduit means 27 extends from the second housing portion to the pressure differential responsive switch. The second housing portion is also provided with second and third conduits 29 and 31 to permit the circulation of an electrochemicaly reducible oxidant adjacent the second electrode. The second and third conduit means may be controlled by one or more flow control devices, not shown.

An electrical lead 33 extends from the first electrode to the pressure differential responsive switch. An electrical lead 35 extends from the pressure differential responsive switch to the multiple position switch 37. To illustrate a simply constructed pressure differential responsive switch, FIGURE 2 illustrates a housing means formed of lower and upper housing portions 39 and 41 having a flexible diaphragm 43 mounted therebetween. A gasket 45 is shown positioned between the upper housing portion and the diaphragm to facilitate sealing around the electrical lead 33. A seal 47 is shown mounted in an aperture in the upper housing portion to seal with the electrical lead 35. The electrical lead 33 is attached to the diaphragm for movement therewith. An electrical contact 40 is mounted by the diaphragm and connected to the electrical lead. The electrical lead 35 is by contrast of substantially rigid construction and is provided with an electrical contact 42 adapted to touch the contact 40 when the diaphragm is not flexed downwardly.

First and second terminal means 49 and 51 are provided for the connection of an electrical load 53, which need not form an element of my combination. An electrical connector 55 extends from the second terminal means to the second electrode. An electrical connector 57 extends between the first terminal means and a terminal 59 of the multiple position switch. An auxiliary electrical load 61 is electrically connected between a terminal 63 of the multiple position switch and the second terminal means. A second auxiliary electrical load or stand-by load 65 is connected between a terminal 67 of the multiple position switch and the second terminal means. A fourth terminal 69 is provided for the multiple position switch, which is not electrically connected to the remaining portions of my device.

In a specific form of my invention in which the electrolyte means is a cation exchange membrane, the electrochemically reducible oxidant is oxygen, the electrochemically oxidizable fuel is hydrogen, the conventional source of said fuel is a continuous hydrogen generator, the flow control device 15 is a pressure regulator, the flow control device 21 is a manually operable valve, the first auxiliary electrical load is substantially equal to the value of the electrical load 53, and the second auxiliary electrical load is of greater resistive value than the electrical load 53, operation of my device may be described as follows:

The construction of my device, being composed entirely of elements which are per se conventional, is considered well within the skill of the art and will not be here discussed. According to preferred practice the pressure regulator is initially set to maintain a hydrogen pressure within the first housing portion 9 substantially below atmospheric. This avoids any danger of creating a dangerous condition by (1) storing hydrogen within the device under pressure or (2) allowing leakage of hydrogen from the device. To ready the apparatus for use it may be desirable to remove air from the first housing portion by attaching a vacuum pump to the conduit 19. When the air pressure within the first housing portion is reduced to the desired low level, the valve means 21 may be closed. Any residual oxygen left within the first housing portion will then be combined with the hydrogen at the first electrode when the device is placed in operation. As an alternate technique of placing my device in operation it may be desirable to omit the initial withdrawal of air and to burn all air initially present in the first housing portion. This technique is not preferred, since it produces larger quantities of heat. Still another technique consists of purging the first housing portion with hydrogen prior to drawing electrical current from the fuel cell. This technique is not preferred, since it involves venting through conduit means a hydrogen-air mixture to the atmosphere, thereby creating a fire hazard in the event of negligent use. The above techniques are, of course, one exemplary and still other techniques will be readily suggested.

Next, an electrical load 53 is connected across the first and second terminal means 49 and 51. Where the electrical load is an integral part of the combination as supplied, this step is, of course, unnecessary. For example, my inventive combination may be mounted within the enclosure of a portable television set, radio, etc. In other instances my device may be packaged separately for use with a variety of electrical loads. The multiple position switch is turned to contact the terminal 59, and the hydrogen generator 17 is attached to the pressure regulator. It is preferred that the gas generator be first attached and started, although for certain types of conventional gas generators, it may be necessary or desirable to first start gas operation before connecting to the pressure regulator. In some types of hydrogen generators it may be desirable to vent the initial product of the generator to avoid introducing a hydrogen-air mixture into the first housing portion. Although any conventional hydrogen generator may be employed, it is noted that the invention is particularly suited for hydrogen generators which supply hydrogen continuously until the reactants are depleted, regardless of the rate of hydrogen consumption in the fuel cell. These types of hydrogen generators can be manufactured at low cost, yet pose no safety hazard, as will be more fully disclosed hereinbelow.

Concurrent with hydrogen introduction into the first housing portion, oxygen is introduced into the second housing portion 11. Hydrogen within the first housing portion is oxidized to hydrogen ions at the first electrode. The hydrogen ions migrate through the cation exchange membrane and combine with oxygen ions formed by reduction at the second electrode to produce water. The water formed as a reaction product may be exhausted through the conduit means associated with the second housing portion either in the form of a liquid or as vapor, depending on the temperature, initial humidity, and flow rate of the oxidant. Electrons liberated from the hydrogen upon its oxidation pass through the electrical lead 33, pressure differential responsive switch 25, electrical lead 35, multiple position switch 37, electrical connector 57, electrical load 53, and electrical connector 55 to the second electrode.

If at any time while the continuous hydrogen generator is active the electrical circuit between the electrodes should open, an excess and potentially hazardous hydrogen pressure would be created in the continuous hydrogen generator or, in the absence of the pressure regulator, in the first housing portion. Many applications can be envisioned, however, where it might be undesirable or even hazardous to be compelled to continuously operate an electrical load until the reactants present in the hydrogen generator have been consumed. This is particularly true where the hydrogen generator is capable of operation over an extended time period between charges. In using my device this safety hazard is avoided by setting the multiple position switch 37 so that electricity passes through the auxiliary load 61. It is preferred that the auxiliary load approximate the intended load so that the fuel cell will operate it its optimum output rate. Insofar as instructing the user is concerned, it is merely necessary to label the terminal 63 of the device as the "OFF" position.

In certain applications it may be desirable to frequently start and stop electrical supply to a load. In such circumstances it is undesirable to consume any more hydrogen than is absolutely necessary to maintain safe pressure levels when electrical supply to the load is interrupted. In such applications it may be desirable to set the multiple position switch so that electrical current passes through the second auxiliary electrical load 65. This load is purposely chosen of a relatively high resistance level to maintain the current level low and to hold hydrogen consumption down to the minimum level consistent with avoiding high pressure buildup within the fuel cell and/or hydrogen generator.

After operation of the usefully employed electrical load 53 has been accomplished and the current is being passed through either of the auxiliary loads merely for the purpose of preventing pressure buildup, there is a potential danger, more to the fuel cell than to personnel, that an excessive pressure differential may be built up across the electrode-eltctrolyte assembly resulting in physical damage thereto. The prevention of unacceptably high pressure differentials is the function of the switch 25. If it is assumed that the first housing portion contains a fixed volume of pure hydrogen and the second housing portion contains an unlimited supply of oxygen, it is then readily apparent that passing a current through an auxiliary load not connected to a pressure differential responsive switch could result in a pressure gradient across the electrode-electrolyte assembly equal to the oxygen pressure. Where the switch 25 is employed, however, hydrogen pressure is sensed on one side of the diaphragm 43 through conduit means 23 while oxygen pressure is sensed on the opposite side of the diaphragm through conduit means 27. When the hydrogen pressure falls below a predetermined level, the diaphragm is flexed downwardly separating contacts 40 and 42 and thus opening the electrical circuit. The switch 25 is merely exemplary of a plurality of conventional pressure differential responsive switches that could be equally as well employed.

While for the sake of clarity, the operation of my device has been described with reference to a specific embodiment, it is appreciated that my invention is of considerably broader scope. While the electrolyte is described with reference to an ion exchange membrane and, specifically, with reference to a cation exchange membrane, it is appreciated that the electrolyte component of the electrode-electrolyte assembly may take the form of any conventional fuel cell electrolyte. Thus, an anion exchange membrane, a matrix immobilized acid or base electrolyte, or a gasket confined free acid or base electrolyte, might be substituted for the cation exchange membrane described. Of course, where an anion membrane or basic electrolyte is employed, it is understood that reaction products will form adjacent the first electrode rather than adjacent the second electrode. In such form it may be desirable to permit a constricted continuous bleed from the flow control device 21 during use. In such circumstance operating pressure would be maintained above atmospheric. In certain applications it may be desirable to close the flow control device at or near the end point of hydrogen generation to prevent back diffusion of air into the first housing portion. Further, collection of at least limited quantities of reaction products within the first housing portion would not preclude operation of my device, although efficiency would be impaired to some extent.

Use of hydrogen as a fuel in combination with a cation exchange membrane or acid electrolyte is preferred, since no reaction products or inert materials are produced which may require venting of the first housing. When other electrochemically oxidizable fuels are employed, such as hydrocarbons, ammonia, etc., it will be necessary to operate my device in a manner similar to that proposed in using an anion exchange membrane or basic electrolyte. Any gaseous electrochemically oxidizable fuel may be employed, and in certain instances, noted below, liquid electrochemically oxidizable fuels may also be used.

The operation of my device has been described with reference to the use of oxygen as an oxidant. It is preferred that air be used as an oxidant. In such case the second housing portion 11 may be partially or totally omitted from the device. Similarly the conduit means 27 would be unnecessary with air operation. It is, of course, recognized that in certain applications it may be desirable to either positively feed air to the second electrode 7 or to restrict convective air contact with the second electrode. In such instance the second housing portion or similar structure may be desirable. It is appreciated that any conventional oxidant—whether gaseous or liquid in form—may be employed in the use of my device. Where oxygen or similar pure oxidant is supplied to the second electrode and a basic electrolyte or anion exchange membrane is employed as an electrolyte for the fuel cell, one of the conduit means in the second housing portion may be dispensed with, since no return flow of oxidant or reaction products from the second housing portion will be required.

Although the invention has been described with references to continuous hydrogen generators, it is appreciated that any conventional generator or storage device for electrochemically oxidizable fuels could be substituted therefor. A generator having particular utility with my device is a Kipp generator. These generators are pressure responsive, and therefore act as a back-up safety feature of the device. Although necessarily somewhat more expensive to construct than continuous feed hydrogen generators, Kipp generators are still susceptible to low cost production. In using a Kipp generator it would be feasible and safe to position the switch 37 in contact with terminal 69. The use of the auxiliary load could be reserved for instances where it was desired to empty the Kipp generator of reactants, such as prior to storage for an extended period or prior to periodic servicing or repair. Where a continuous generator is employed it would be preferable, of course, to omit the terminal 69 altogether from the device.

In describing the invention, description has been directed to a device in which the source 17 supplies a gaseous fuel while the second housing portion is provided with an oxidant. Although practical applications do not appear likely, it is recognized that the source 17 could alternately be used to supply an electrochemically reducible oxidant in gaseous form while a fuel—either liquid or gaseous—is supplied to the second housing portion. Still further, it is anticipated that a source such as 17 could be attached to both the first and second housing portions to deliver fuel and oxidant, respectively.

While two auxiliary electrical loads have been described and illustrated, it is appreciated that only a single electrical load is necessary. While it is preferred that the auxiliary electrical load approximately match the utility load, it is recognized that use of larger or smaller auxiliary loads is feasible. Auxiliary loads of such low value as to be tantamount to an electrical short circuit between the electrodes of the fuel cell are not preferred, since high currents significantly decrease the operating life of a fuel cell. On the other hand, the auxiliary load should provide a sufficiently low resistance that hazardous pressure buildups in the first housing portion can be avoided. In certain applications it may be desirable to substitute a rheostat for one or more fixed resistance auxiliary loads such that the desired rate of reactant consumption can be gauged by the operator of the device.

Noting FIGURE 3, an alternate control arrangement is disclosed for my device, which effectively allows automatic switching to an auxiliary load as may be required by the pressure buildup within the first housing portion. Conduit means 23 and 27 extends from the first and second housing portions to a device 101. The device 101 may take the form of any conventional apparatus for varying the angular position of a contact element 103 as a function of pressure differential. As shown, increase in pressure differential between the housing portions will rotate the contact element about a pivot axis 105 in a clockwise direction. Device 101 may be constructed using a Bourdon tube as the pressure differential to position transducer, for example. In another exemplary construction a rack may be associated with a flexible diaphragm similar to diaphragm 43, and the rack would cooperate with a pinion gear attached to the pivot axis 105. Flexure of the diaphragm would translate the rack and rotate the pinion gear.

Electrical lead 107 is attached to the first electrode and extends to the pivot axis for electrical connection with the contact element 103. A post 109 is provided to limit travel of the counter element in a counterclockwise direction. An outer, substantially resistance-free contact strip 111 is mounted on the device for engagement by the contact element. An electrical conductor 113 extends between the first terminal means 49 and the outer contact strip. A two-position manual switch 123 is mounted in the electrical conductor 113.

An inner contact strip 115 is mounted on the device and formed of a high resistance or auxiliary load section 117 and a low resistance or short circuit section 119. An electrical conducting means 121 connects the short circuit section of the inner conductive strip and the second terminal means 51 to the second electrode of the fuel cell.

For a specific application where hydrogen is the fuel, air the oxidant, a continuous feed hydrogen generator is employed, an acid electrolyte or cation exchange membrane is employed as an electrolyte, and the first housing portion is initially maintained below atmospheric pressure, operation of the modified form of my device may be described as follows:

The pressure supplied to the device 101 through conduit means 23 will initially be at a low value, thereby causing the contact element 103 to assume a position at or near the post 109. When hydrogen is supplied to the first housing portion from the continuous feed hydrogen generator, the pressure within the first housing portion, conduit means 23, and device 101 will increase causing the contact element to rotate clockwise into engagement with the outer contact strip 111. This will then close an electrical circuit between the first and second electrodes through pivot axis 105, contact element 103, outer contact strip 111, electrical conductor 113, manual switch 123, load 53, and conducting means 121.

In most instances supply of electrical energy to the load 53 will consume enough hydrogen to prevent the pressure from increasing sufficiently to cause the contact element to rotate into contact with the auxiliary load section of the inner contact strip. Should the electrical load 53, however, draw insufficient current to maintain the hydrogen pressure at a desirably low level (for example, when the manual switch 123 is opened), the contact element will rotate into contact with the auxiliary load section of the inner terminal strip and increase the current flowing between the electrodes by providing an auxiliary flow path. In the vast majority of instances the pressure within the first housing portion can be stabilized by the shunt current through the auxiliary electrical load. It is noted that with still higher pressure differentials, the resistance of the auxiliary load will decrease in proportion, and thus automatically adjust itself to an auxiliary load of proper magnitude to avoid excessive pressure buildup in the fuel cell.

To provide for the emergency situation where the auxiliary load is incapable of passing sufficient current to control the pressure buildup in the first housing portion, a short circuit section 119 is provided. When a dangerously high pressure level is reached in the first housing portion, the contact element will be rotated clockwise into contact with the short circuit section, thus shorting the electrodes of the fuel cell and reducing the hydrogen pressure at the maximum possible rate. This feature of the invention would not normally be used, except perhaps for fractional second intervals with an uneven hydrogen supply. Under circumstances where the device is being misused, however, this feature may prove beneficial in preventing personnel injury and/or gross damage to the fuel cell.

When the gas supply for the generator is expended, continued consumption of hydrogen by the fuel cell will decrease the pressure in the first housing portion. The contact element will then move counterclockwise out of contact with both of the contact strips, thereby preventing damage to the electrode-electrolyte assembly through the creation of an undesirably low pressure in the first housing portion.

While my invention has been described with specific reference to a fuel cell, it is appreciated that application of my invention to a fuel battery, which is nothing more than a collection of fuel cells, would be well within the skill of the art. While numerous modifications of my invention have been suggested, it is appreciated that this further modification will be readily suggested to those skilled in the art. It is accordingly intended that the scope of my invention be determined by reference to the following claims.

What I claim as new and desire to secure by Letters Patent of the United States is:

1. The combination comprising
   a fuel cell electrode-electrolyte assembly formed of
      first and second electrodes and
      electrolyte means separating said electrodes,
   housing means cooperating with said electrode-electrolyte assembly for confining a gaseous first reactant adjacent said first electrode and for permitting a second reactant to contact said second electrode, and
   means providing an electrical circuit extending between said electrodes comprised of
      first and second terminal means for permitting an electrical load to be connected thereto,
      means for selectively shunting said electrical load, and
      means for selectively opening said electrical circuit between said electrodes in response to a predetermined negative pressure adjacent said first electrode as compared to the pressure adjacent said second electrode.

2. The combination according to claim 1 in which said selective shunting means includes an electrical resistance approximating that of the electrical load.

3. The combination according to claim 1 in which said selective shunting means includes means for reducing the resistance to current flow through said shunting means in response to pressure increase adjacent said first electrode.

4. The combination according to claim 1 in which said selective shunting means exhibits a high electrical resistance as compared to the electrical load.

5. The combination according to claim 1 in which said selective opening means is comprised of a pressure differential responsive switch.

6. The combination according to claim 1 additionally including a continuous gas generator and means for delivering gas from said generator to said housing means adjacent said first electrode.

7. The combination according to claim 6 in which said gas delivering means includes means for regulating the flow of gas to said housing means.

8. The combination according to claim 1 additionally including a Kipp generator and means for delivering gas from said generator to said housing means adjacent said first electrode.

9. The combination comprising
   a fuel cell electrode-electrolyte assembly formed of
      first and second electrodes and
      electrolyte means separating said electrodes,
   housing means cooperating with said electrode-electrolyte assembly for confining a gaseous first reactant adjacent said first electrode and for permitting a second reactant to contact said second electrode, and
   means providing an electrical circuit extending between said electrodes comprised of
      first and second terminal means for permitting an electrical load to be connected thereto,
      means connecting said first terminal means to one of said electrodes,
      and auxiliary electrical load electrically connected to said first terminal means,
      means extending between the remaining of said electrodes and said second terminal means including a first switch means permitting alternative electrical connection of said remaining of said electrodes to said auxiliary electrical load, and
      second switch means for selectively opening said electrical circuit between said electrodes in response to a predetermined negative pressure adjacent said first electrode as compared to the pressure adjacent said second electrode.

10. The combination comprising
   a fuel cell electrode-electrolyte assembly formed of
      first and second electrodes and
      electrolyte means separating said electrodes,
   housing means cooperating with said electrode-electrolyte assembly for confining a gaseous first reactant adjacent said first electrode and for permitting a second reactant to contact said second electrode, means communicating with said housing means including a movable contact element for sensing and transducing a pressure differential between said first electrode and said second electrode into an angular position of said contact element, means for electrically connecting said contact element to one of said electrodes, first means mounted to contact said contact element in a first angular position thereof, second means mounted to contact said contact element in a second angular position thereof, first and second terminal means for permitting an electrical load to be connected thereto, means for connecting said first terminal means to said first means, and means for connecting said second terminal means to said second means and the remaining of said electrodes.

References Cited

FOREIGN PATENTS 172,881   8/1965   U.S.S.R.

ALLEN B. CURTIS, *Primary Examiner.*